United States Patent [19]

Takagi

[11] 4,257,449
[45] Mar. 24, 1981

[54] HOSE COUPLING FOR A FAUCET

[76] Inventor: Tosio Takagi, 3-5, Shirogane 1-chome, Kokurakita-ku, Kitakyushu-shi, Fukuoka-ken, Japan

[21] Appl. No.: 44,463

[22] Filed: Jun. 1, 1979

[30] Foreign Application Priority Data

Jun. 10, 1978 [JP] Japan .................. 53-70220

[51] Int. Cl.³ .......................................... F16K 31/12
[52] U.S. Cl. ......................... 137/505.25; 137/505.41; 285/338;247
[58] Field of Search ...................... 137/505.25, 505.41; 285/338, 247

[56] References Cited

U.S. PATENT DOCUMENTS

| 921,272 | 5/1909 | McCarthy | 137/505.25 |
|---|---|---|---|
| 993,155 | 5/1911 | DeSalme | 285/247 |
| 1,595,310 | 8/1926 | Mueller | 285/338 |
| 3,792,717 | 2/1974 | Tibbals | 137/505.25 |
| 4,089,343 | 5/1978 | Ishida | 137/505.41 X |

FOREIGN PATENT DOCUMENTS

| 540014 | 7/1922 | France | 137/505.25 |
| 536659 | 5/1941 | United Kingdom | 137/505.25 |

*Primary Examiner*—Harold W. Weakley
*Attorney, Agent, or Firm*—Wenderoth, Lind & Ponack

[57] ABSTRACT

A hose coupling for use with a faucet, including an upright rod which is adapted for vertical motion in response to the water pressure in the hose. When the water pressure in the hose is normal, the upright rod moves to the upper limit of its range of travel, and slightly projects upward beyond a valve seat, pushing up a steel ball valve, and allowing the water to be discharged from the hose tip. If the water pressure in the hose increases abnormally, the upright rod retracts downward and allows the ball valve to fit on the valve seat.

7 Claims, 3 Drawing Figures

HOSE COUPLING FOR A FAUCET

BACKGROUND OF THE INVENTION

The present invention relates to an improved hose coupling for use with a faucet.

SUMMARY OF THE INVENTION

It is an object of the present invention to provide a hose coupling which incorporates a valve which automatically closes to shut off the water supply if the hose should be folded or flattened out resulting in an abnormal increase in water pressure in the hose.

It is another object of the present invention to provide a hose coupling in which said valve automatically opens to resume the water supply when the water pressure in the hose returns to a normal level.

With these objects in view, the invention will become apparent from the following detailed description, which will be more clearly understood in connection with the accompanying drawings, in which:

DETAILED DESCRIPTION OF THE INVENTION

Figure 1:
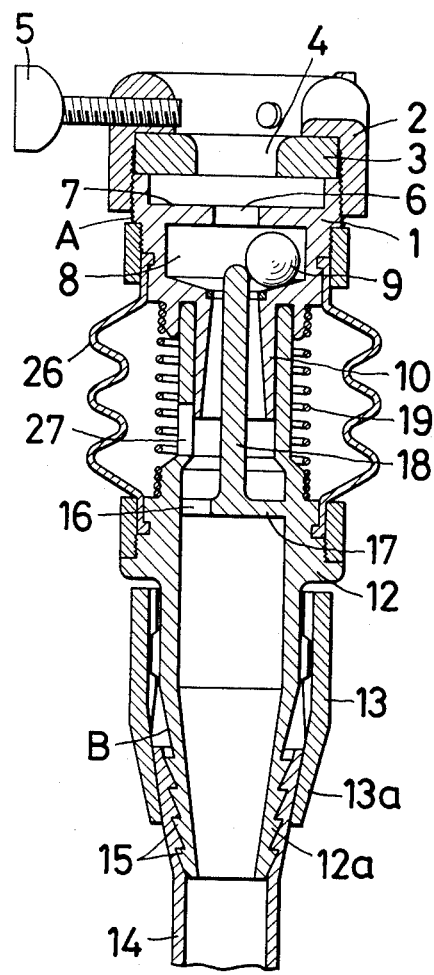
FIG. 1 is a partially cutaway side view of one embodiment of the present invention.
Figure 2:
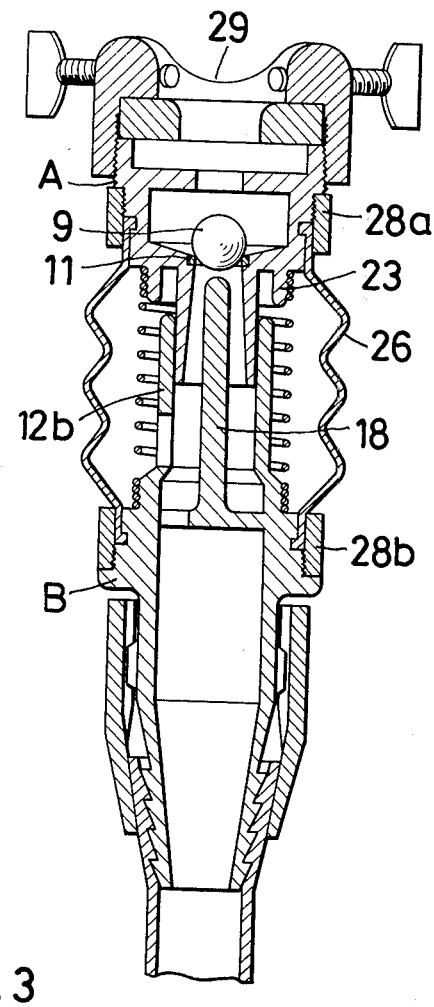
FIG. 2 is a front view thereof.

Referring now to FIGS. 1 and 2, a hose coupling, in accordance with the present invention, includes an upper body A which can be connected to a faucet, and a lower body B which is slidably mounted on the lower part of the upper body A.

The upper body A includes a funnel-shaped main part 1, a cap nut 2 which is screwed onto the main part 1. A narrow portion 10 is provided below the main part 1 and is in communication therewith. The narrow portion 10 is adapted for allowing the lower body B to slide thereon, and a piece of comparatively thick packing 3 is interposed between the main part 1 and the cap nut 2 and has a hole 4 in the center thereof. Three thumbscrews 5 project inwardly through the cap nut 2 in a manner such that their axes intersect at a point which lies on the axis of the cap nut 2. The main part 1 has a partition wall 7 which extends transversely and has a hole 6 for allowing the water to pass therethrough. A valve chest 8 is located between the partition wall 7 and the upper end of the narrow portion 10. A packing ring 11 is mounted on the upper brim of the narrow portion 10 and serves as a valve seat on which a steel ball valve 9 fits. A downwardly extending sleeve 23 is provided which is concentric with the narrow portion 10 on the under surface of the base plate of the main part 1.

The lower body B includes a main tubular part 12 and a ring nut 13 which fits on the lower half of the main part 12. The main part 12 and the ring nut 13 have lower portions 12a and 13a which are tapered toward their lower ends. The main part 12 further includes an upper portion 12b, which is adapted to fit slidably on the narrow portion 10. The upper body A and lower body B are constantly urged toward each other by a tension coil spring 19.

A partition wall 17 extends transversely from the inner wall of the main part 12. A hole 16 is provided in the partition wall 17 at one end thereof for allowing the water to pass therethrough. An upright rod 18 having a diameter which is smaller than the diameter of the valve seat 11, extends upward from the partition wall 17 and is concentric to the upper portion 12b of the main part 12, and has a length such that, when the lower body B is at the upper limit, the rod 18 slightly projects beyond the valve seat 11 and pushes the ball valve 9 upward.

Figure 3:
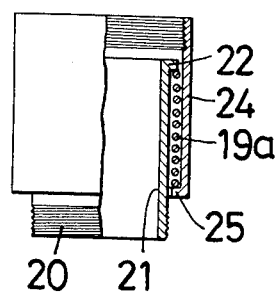
FIG. 3 is a partially cutaway side elevation of a portion of another embodiment of the present invention.

Referring now to FIG. 3, a compression coil spring 19a may be used in place of the tension coil spring 19. In this embodiment, the inside diameter of the upper portion 12b of the main part 12 is slightly larger than the outside diameter of the narrow portion 10 so as to permit interposition of a sleeve 21. The lower end of the sleeve 21 has a male threaded portion 20 which fits into the upper portion 12b of the main part 12. The sleeve 21 is telescopically received within another sleeve 24. The sleeve 24 is screwed on the sleeve 23, and the compression coil spring 19a is held between an outward flange 22 which is located at the upper end of the sleeve 21 and an inward flange 25 which is located at the lower end of the sleeve 24.

Referring again to FIGS. 1 and 2, the connection between the upper body A and the lower body B is kept watertight by means of pressure-resisting bellows 26. The upper end of the bellows 26 is secured to the outer surface of the main part 1 of the upper body A by means of a ring 28a, while the lower end thereof is secured to the outer surface of the main part 12 of the lower body B by means of a ring 28b. The space between the bellows 26 and the tubular wall of the upper portion 12b of the lower body B communicates with the inside of the lower body B by means of a hole 27.

In order to mount the hose coupling on a faucet, the tip of the faucet is inserted into the hole 4 and the packing 3 only moderately pressed down by the cap nut 2. The thumbscrews 5 are then turned and driven inwards so that the upper body A is tightly secured to the faucet. Thereafter, the packing 3 spreads sideways when it is pressed hard as a result of tightening the threads between the main part 1 and the cap nut 2. As a result, the packing 3 comes into watertight contact with the external surface of the faucet. A concave surface 29 which is located on the top of the cap nut 2 is placed against the under surface of the horizontal portion of the faucet when the vertical portion thereof is too short to allow its tip to come into watertight contact with the packing 3.

In order to connect a hose 14 to the hose coupling, the hose end is inserted into the opening between the lower end portion 12a of the main part 12 and the lower end portion 13a of the ring nut 13. The size of the opening is then decreased by tightening the ring nut 13 so that the ring-shaped projections 15, which are located in tiers on the external surface of the lower end portion 12a of the main part 12, bite into the internal surface of the hose 14 for tightly holding the end of the hose 14 with the hose coupling.

As long as the water pressure in the hose 14 is normal, the bellows 26 remain in a deflated condition and the lower body B is held at the upper limit of its range of travel by the tension of the coil spring 19. Accordingly the ball valve 9 remains open and the water is discharged through the hose tip.

If the hose is folded or flattened out so that the water pressure in the hose increases, the water pressure in the bellows 26 also increases and causes the bellows 26 to expand and force the lower body B down against the tension of the coil spring 19. As a result the rod 18 is retracted to allow the ball valve 9 to fit onto the valve seat 11, for cutting off the water supply.

When the cause of pressure increase is removed and the water pressure in the hose returns to normal, the water pressure in the bellows 26 also returns to normal and the tension of the coil spring 19 causes lower body B and upper body A to move toward each other. As a result the lower body B is raised and allows the rod 18 to project slightly upward beyond the valve seat 11 and forces up the ball valve 9. Thus the water supply is automatically resumed.

An advantage of the hose coupling of the present invention is that the bursting of the hose can be prevented by the automatic cutting off of water supply at the time of the accidental pressure increase in the hose.

Another advantage is that the hose coupling of the present invention allows the temporary interruption of water supply simply by folding or trampling down on the hose and thus, permits resumption of water supply by simply by straightening out the hose or removing the foot from the hose.

While several embodiments of the present invention have been disclosed, it is to be understood that they are described by way of example only and not in a limiting sense, the scope of the present invention is determined by the following claims.

What I claim is:

1. A hose coupling for use with a faucet, said hose coupling comprising:
   a main casing having a first threaded portion on the outer surface at the top thereof, said main casing having a cavity in the center thereof and there being an opening extending from the top portion of said casing through said cavity and to the bottom for defining a fluid passage therethrough;
   valve means and valve seat means located in said cavity for closing off said opening;
   a cap nut screwed on said threaded portion of said main casing, packing means interposed between said cap nut and said main casing, both said cap nut and said packing means having a hole in the center thereof for communicating with said opening through said main casing;
   a hollow cylindrical extension connected to and extending downward from said cavity and communicating therewith through said valve seat;
   a tubular lower body slidably received on said hollow cylindrical extension, said lower body having valve closing means for keeping said valve means open when fluid pressure in the hose is normal and closing when fluid pressure abnormally increases;
   a first sleeve concentrically attached to said casing at the lower end thereof, said first sleeve having a flange extending therefrom;
   spring means in contact with said lower body and with said flange for urging said casing and lower body together and for having said valve closing means maintain said valve means open during normal fluid pressure conditions;
   pressure sensing means connected to said casing and said lower body, said pressure sensing means comprising a bellows attached outside said first sleeve to said casing and and to said lower body, an opening in the side wall of said tubular lower body, said opening being in a portion of said lower body which extends within said bellows, for allowing fluid pressure to act on said bellows wherein, when fluid pressure increases abnormally, said bellows expands to overcome the spring force of said spring means for causing said casing and said lower body to separate for causing said valve closing means to close said valve means; and
   hose clamping means located at the lower end of said tubular lower body for connecting a hose thereto.

2. A hose coupling as in claim 1 wherein said cap nut comprises attachment means for attaching to a faucet and said packing means is of a thickness sufficient for sealing against the faucet when the hose coupling is attached thereto.

3. A hose coupling as in claim 1 wherein said valve seat means is located in the central portion of said cavity.

4. A hose coupling as in claim 1 further comprising a second sleeve concentrically attached to said lower body, inside said lower body, said second sleeve having an outwardly extending flange around the top thereof, said second sleeve telescopically received within said first sleeve, said first sleeve flange being an inwardly extending flange, said spring means comprising a compression spring located around said second sleeve in contact with said lower body between said inwardly and outwardly extending flanges for urging said first and second sleeves apart for urging said casing and tubular lower body together.

5. A hose coupling as in claim 1 wherein said valve means and said valve seat means comprise a ball valve and a seat, said valve closing means comprising a rod concentrically attached to said tubular lower body for moving said ball off said seat when said casing and tubular lower body are urged together.

6. A hose coupling as in claim 1 wherein said hose clamping means comprises a tapered portion at the lower end of said tubular lower body having serrations on the outer surface thereof for having a hose received and held thereon, a threaded ring nut for being received over the hose on said tapered portion for holding the hose thereon.

7. The hose coupling as set forth in claim 2, wherein said spring means for urging said lower body toward said casing comprises a tension coil spring.

* * * * *